United States Patent
Odell et al.

(10) Patent No.: US 7,501,015 B2
(45) Date of Patent: Mar. 10, 2009

(54) PHASE CHANGE INKS

(75) Inventors: Peter Gordon Odell, Mississauga (CA); Paul F. Smith, Oakville (CA); Jennifer Lynne Belelie, Oakville (CA); Eniko Toma, Mississauga (CA); Stephan Drappel, Toronto (CA); C. Geoffrey Allen, Waterdown (CA); Rina Carlini, Mississauga (CA); Christopher A. Wagner, Toronto (CA)

(73) Assignee: Xerox Corporation, Norwalk, CT (US)

( * ) Notice: Subject to any disclaimer, the term of this patent is extended or adjusted under 35 U.S.C. 154(b) by 184 days.

(21) Appl. No.: 11/289,620

(22) Filed: Nov. 30, 2005

(65) Prior Publication Data

US 2007/0120908 A1    May 31, 2007

(51) Int. Cl.
*C09D 11/00* (2006.01)
(52) U.S. Cl. .................. 106/31.29; 106/31.61
(58) Field of Classification Search ........... 106/31.29, 106/31.61
See application file for complete search history.

(56) References Cited

U.S. PATENT DOCUMENTS

| | | | |
|---|---|---|---|
| 5,000,786 A * | 3/1991 | Matsuzaki | 106/31.3 |
| 5,372,852 A | 12/1994 | Titterington et al. | |
| 5,389,958 A | 2/1995 | Bui et al. | |
| 6,547,380 B2 | 4/2003 | Smith et al. | |
| 7,153,349 B2 * | 12/2006 | Carlini et al. | 106/31.29 |
| 2004/0132862 A1 * | 7/2004 | Woudenberg | 523/160 |
| 2007/0123601 A1 * | 5/2007 | Belelie et al. | 522/95 |

OTHER PUBLICATIONS

Crivello et al., "Photoinitiated Cationic Polymerization of Epoxy Alcohol Monomers," Journal of Polymer Science, Part. A, Polymer Chemistry, vol. 38, pp. 389-401, 2000.

* cited by examiner

*Primary Examiner*—Jerry Lorengo
*Assistant Examiner*—Veronica Faison Gee
(74) *Attorney, Agent, or Firm*—Oliff & Berridge, PLC

(57) ABSTRACT

The phase change ink a viscosity of from about 4 mPa-s to about 50 mPa-s at a first temperature and has a viscosity of from $10^4$ mPa-s to about $10^9$ mPa-s at a second lower temperature. The second temperature may be below the first temperature by at least 10° C. but by no more than 50° C. The first temperature may be from about 60° C. to about 110° C. and the second temperature may be from about 20° C. to about 70° C. A curve of $\log_{10}$ viscosity of the phase change ink plotted against temperature in degrees Celsius may have a slope having an absolute value less than 0.02 at the first temperature and have a slope having an absolute value greater than 0.08 for at least a region second temperatures.

20 Claims, 3 Drawing Sheets

PHASE CHANGE INKS

BACKGROUND

The present disclosure generally relates to phase change inks, particularly curable phase change inks, and their use in methods for forming images, particularly their use in ink jet printing.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In the art, it is known to use phase change inks, also referred to as hot-melt inks. In general, phase change inks are in the solid phase at, for example, ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typically systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

However, the use of crystalline waxes places limitations on the printing process. First, the printhead must be kept at about 130° C. during the print process. Moreover, when the printhead is cooled and re-warmed, the resulting contraction and expansion of the ink requires a purge cycle to achieve optimum printhead performance. Furthermore, increased mechanical robustness is desired.

While known compositions and processes are suitable for their intended purposes, a need remains for improvements in phase change inks, for example with respect to jetting temperatures and image quality.

Recently, Xerox has discovered several curable inks that achieve more robust images following curing. Reference is made to the following patent properties, each of which is incorporated herein by reference in its entirety. (1) Co-pending application Ser. No. 11/034,850 filed Jan. 14, 2005, (2) Co-pending application Ser. No. 11/034,856 filed Jan. 14, 2005, (3) Co-pending application Ser. No. 11/034,714 filed Jan. 14, 2005, (4) Co-pending application Ser. No. 11/018,378 filed Dec. 22, 2004, and (5) Co-pending application Ser. No. 11/034,866 filed Jan. 14, 2005.

SUMMARY

The present disclosure describes a phase change ink, particularly a radiation curable phase change ink, that can be used in ink jet printing.

In embodiments, the phase change ink has a viscosity of from about 4 mPa-s to about 50 mPa-s, preferably 4 mPa-s to about 22 mPa-s, and more preferably from about 9 mPa-s to about 12 mPa-s, at a first temperature and has a viscosity of from about $10^4$ mPa-s to about $10^9$ mPa-s, preferably from about $5 \times 10^4$ mPa-s to about $10^7$ mPa-s, at a second temperature.

In embodiments, the second temperature is below the first temperature by at least 10° C. and by no more than 50° C. Preferably the second temperature is from 15° C. to 45° C. below the first temperature; and more preferably the second temperature is from 20° C. to 40° C. below the first temperature. Such an ink provides a rapid change in rheological properties over a narrow temperature range, which controls the drop spread, film formation properties, and image bleed.

In embodiments, the first temperature is from about 60° C. to about 110° C., preferably from about 70° C. to about 90° C., and the second temperature is from about 20° C. to about 70° C., preferably from about 30° C. to about 70° C. These temperatures allow for jetting at a relatively low temperature and rapid cooling of the ink upon hitting the substrate.

In embodiments, the phase change ink has a storage modulus, G', of from about $10^{-3}$ to about $10^{-2}$ Pa at the first temperature and of at least about 10 Pa, preferably from about 10 to about $10^4$ Pa, at the second temperature. In embodiments, the phase change ink has a loss modulus, G", of from about $10^{-3}$ to about $10^{-1}$ Pa at the first temperature and of at least about 10 Pa at the second temperature. In certain embodiments, the phase change ink has a storage modulus, G', that is higher than its loss modulus, G", at the second temperature, particularly when the ink is being used in a system in which the image is transferred from an intermediate substrate to the final recording substrate. The ratio of G" to G' is referred to as the tan_delta and is a measure of the damping properties of materials. Thus, where tan_delta is less than one, G' is higher than G".

The shape of the curve of a plot of log viscosity against temperature can also be important in determining the performance of a phase change ink. In particular, it is desirable that the slope of the curve in the jetting region be low, so the change of viscosity with temperature is small to allow consistent jetting. The jetting region may be from 60-110° C., although it is understood that for any individual ink formulation the jetting region may only be ±5-10° C. of the temperature at which the ink has a viscosity of, for example, about 10 mPa-s. Thus in one individual ink formulation the jetting region might be 70-80° C., while in another it might be 90-110° C. Below the jetting temperature it is desirable to have a sharp and steep transition to high viscosity, which is reflected in the slope of log viscosity versus temperature curve. Absolute values of the slope of 0.2-0.4/° C. or higher are desired. Once the high viscosity is reached the slope of the log viscosity versus temperature curve should decrease; while desirable it is not required to be as low as the slope in the jetting temperature region.

Thus, in embodiments of the invention, the curve of $\log_{10}$ viscosity of the phase change ink plotted against temperature in degrees Celsius has a slope having an absolute value less than 0.02 at the first temperature. In embodiments, the curve of $\log_{10}$ viscosity of the phase change ink plotted against temperature in degrees Celsius has a slope having an absolute value greater than 0.08, preferably greater than 0.2, for at least a region between the first and second temperatures. In embodiments, the curve of $\log_{10}$ viscosity of the phase change ink plotted against temperature in degrees Celsius has a slope having an absolute value less than 0.04, preferably less than 0.02, at the second temperature. However, in other embodiments, this is not the case.

The present disclosure also relates to a method for applying the ink to form an image. In embodiments, the method comprises providing the ink at or above the first temperature; applying the ink to a substrate to form an image, the substrate being at or below the second temperature. Where the ink is radiation curable, the method preferably further comprises exposing the ink to radiation to cure the ink. In a preferred embodiment, the composition is applied over the image by ink jet printing.

BRIEF DESCRIPTION OF THE DRAWING

Various exemplary embodiments of the disclosure will be described in detail, with reference to the following figures, wherein.

DETAILED DESCRIPTION OF EMBODIMENTS

Figure 1:
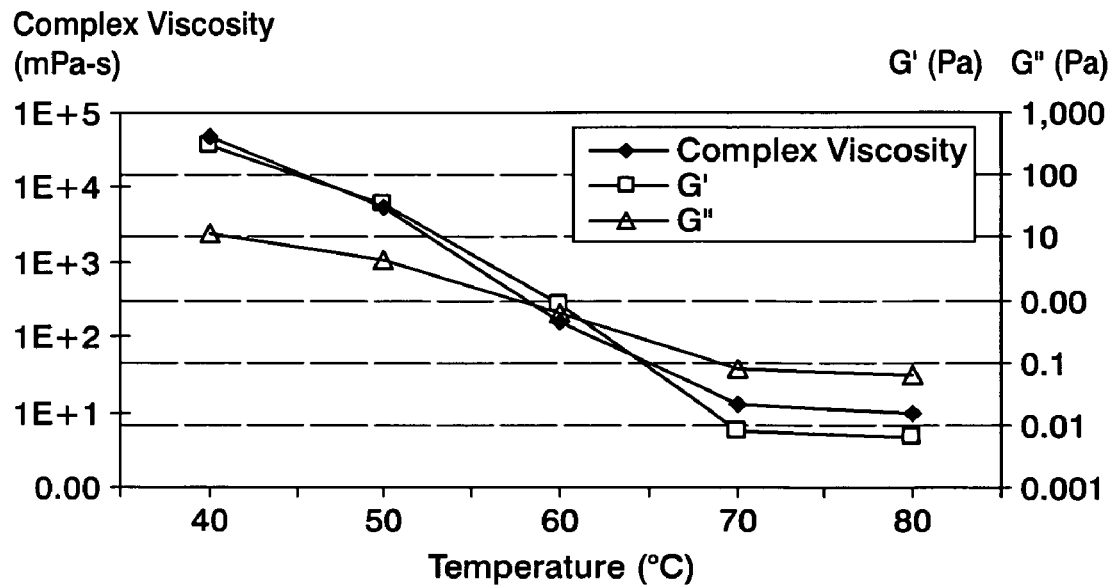
FIG. 1-4 each depict the rheological properties of a composition within the present disclosure.

As used herein, the term "viscosity" refers to a complex viscosity, which is the typical measurement provided by a mechanical spectrometer that is capable of subjecting a sample to a steady shear strain or a small amplitude sinusoidal deformation. In this type of instruments, the shear strain is applied by the operator to the motor and the sample deformation (torque) is measured by the transducer. Examples of such instruments are the Rheometrics Fluid Spectrometer RFS3 or the ARES mechanical spectrometer, both made by Rheometrics, a division of TA Instruments. Alternatively a controlled stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, ω, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*=\eta'-i\,\eta''$; where $\eta'=G''/\omega$, $\eta''=G'/\omega$ and i is $\sqrt{-1}$. Alternatively a viscometer that can measure only the transient measurement of, for instance, a capillary or shear viscosity such as the ones made by Brookfield Engineering Laboratories or Cannon Instrument Company can also be used.

The composition of the present disclosure is a phase change ink. The composition may contain any combination of elements, as long as it meets physical properties encompassed by this disclosure. Components that may be used to form the composition are disclosed in, for example, to the following patent properties, each of which is incorporated herein by reference in its entirety. (1) Co-pending application Ser. No. 11/034,850 filed Jan. 14, 2005, (2) Co-pending application Ser. No. 11/034,856 filed Jan. 14, 2005, (3) Co-pending application Ser. No. 11/034,714 filed Jan. 14, 2005, (4) Co-pending application Ser. No. 11/018,378 filed Dec. 22, 2004, (5) Co-pending application Ser. No. 11/034,866 filed Jan. 14, 2005, (6) Co-Pending application Ser. No. 11/289,473 entitled "RADIATION CURABLE PHASE CHANGE INKS CONTAINING CURABLE EPOXY-POLYAMIDE COMPOSITE GELLANTS" (Xerox Ref. No. 20031091-US-NP; O&B Ref. 123685); and (7) Co-Pending application Ser. No. 11/289,609 entitled "RADIATION CURABLE PHASE CHANGE INKS CONTAINING GELLANTS" (Xerox Ref. No. 20030937-US-NP; O&B Ref. 122089).

Since the composition is a phase change ink, it includes at least one component that provides for the phase change. An agent that provides for this phase change is referred to hereinafter as a "phase change agent."

This phase change agent can be any component that is miscible with the other components of the composition and promotes the increase in viscosity of the ink as it cools from the jetting temperature, preferably between 60 and 110° C., to the substrate temperature, which is preferably between 20° C. and 50° C. Examples of classes of phase change agents include solid alcohols, waxes and gellants.

In one embodiment, a wax acts as a phase change agent. As used herein, the term wax includes natural, modified natural, and synthetic waxes.

Suitable phase change agents include hydroxyl-terminated polyethylene waxes such as mixtures of carbon chains with the structure $CH_3\text{-}(CH_2)_n\text{-}CH_2OH$, where there is a mixture of chain lengths, n, where the average chain length is preferably in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite (Sand Springs, Okla.).

Other suitable phase change agents include, but are not limited to, hydrogenated castor oil, 1-octadecanol, 1,10-decanediol and 1,12-dodecanediol. Other examples of mono functional alcohols that can be employed as phase change agents herein include 1-tetradecanol, 1- pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

In another embodiment, a gellant is used as the phase change agent. The organic gellant functions to dramatically increase the viscosity of the ink within a desired temperature range. In particular, the gellant forms a semi-solid gel in the ink vehicle at temperatures below the specific temperature at which the ink is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, and the like, which upon stimulation by physical forces such as temperature and mechanical agitation or chemical forces such as pH or ionic strength, can reversibly transition from liquid to semi-solid state at the macroscopic level. The inks exhibit a thermally reversible transition between the semi-solid gel state and the liquid state when the temperature is varied above or below the gel point of the ink. This reversible cycle of transitioning between semi-solid gel phase and liquid phase can be repeated many times in the ink formulation.

The ink compositions generally also contain a colorant. Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention.

Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

The colorant is preferably included in the ink in an amount of from, for example, about 0.1 to about 15% by weight of the ink, preferably about 0.5 to about 6% by weight of the ink.

To provide a curable ink, the composition generally comprises a curable monomer. In embodiments, curing of the monomer is radically or cationically initiated.

In embodiments, the monomer is equipped with one or more curable moieties, including, but not limited to, vinyl ethers; epoxides, such as cycloaliphatic epoxides, aliphatic epoxides, and glycidyl epoxides; oxetanes; (meth)acrylates, that is, acrylates and methacrylates; and the like.

In a particular embodiment, the monomers are urethanes. These compounds are the reaction product of an isocyanate and an alcohol equipped with at least one cationically polymerizable group.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl) ethylisocyantes; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1,6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Some specific examples of suitably functionalized alcohols include 1,4-butanediol vinyl ether, 1,4-cyclohexanedimethanol vinyl ether, ethylene glycol vinyl ether, di(ethylene glycol) vinyl ether, glycidol, 3-methyl-3-oxetanemethanol, glycerol diglycidyl ether, all of which are available from Sigma-Aldrich (Milwaukee, Wis.); 3,4-epoxycyclohexanemethanol, which can be prepared as described by Crivello and Liu (J. Polym. Sci. Part A: Polym. Chem. 2000, vol. 38, pp 389-401); and the like.

In particular, the following diurethane divinyl ether oil, bis[4-(vinyloxy)butyl]trimethyl-1,6-hexanediylbiscarbamate (mixture of 2,2,4- and 2,4,4-isomers), which is the reaction product of 1,4-butanediol vinyl ether and trimethyl-1,6-diisocyanatohexane (mixture of 2,2,4- and 2,4,4-isomers) (see Example 1), is preferred:

In one preferred embodiment, the photoinitiator is a cationic photoinitiator. Examples of suitable cationic photoinitiators include, but are not limited to, aryldiazonium salts, diaryliodonium salts, triarysulfonium salts, triarylselenonium salts, dialkylphenacylsulfonium salts, triarylsulphoxonium salts and aryloxydiarylsulfonium salts.

In another embodiment, the photoinitiator is a radical photoinitiator. As the photoinitiator for inks that are cured by free radical polymerization, e.g., inks containing acrylate groups or methacrylate groups, mention may be made of photoinitiators such as benzophenones, benzoin ethers, benzil ketals, α-hydroxyalkylphenones, α-aminoalkylphenones and acylphosphine photoinitiators sold under the trade designations of IRGACURE and DAROCUR from Ciba. Specific examples include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenylphosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl) propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free radical reaction upon exposure to a desired wavelength of radiation such as UV light can be used without limitation.

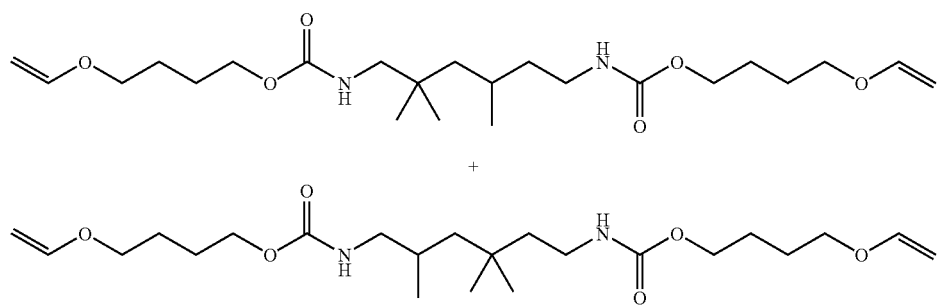

In embodiments, the composition further comprises an initiator that initiates polymerization of the curable monomer. Preferably, the initiator is a photoinitiator that absorbs radiation, for example UV light radiation, to initiate curing of the curable components of the ink. The photoinitiator should be soluble in the composition.

In embodiments, the composition may further comprise a low viscosity additive to reduce the jetting viscosity. Examples of this additive include, but are not limited to, VEctomers® 4230, 3080 and 5015 (available from Morflex Inc., Greensboro, N.C.), which have the following chemical structures:

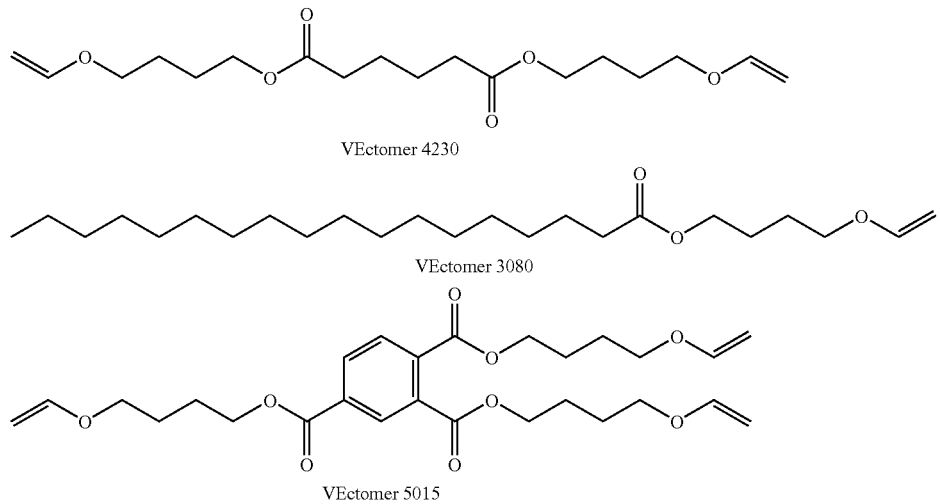

VEctomer 4230

VEctomer 3080

VEctomer 5015

Another suitable low viscosity additive is bis[4-(vinyloxy) butyl]dodecanedioate:

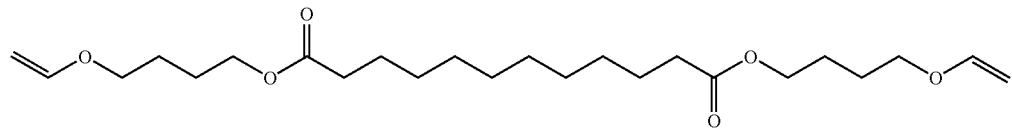

Additional optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

The behavior of many fluids can be characterized by a change in fluid viscosity with temperature. For instance, the viscosities of common motor oils are plotted against temperature. When the plot is made in a semi-log fashion (log viscosity vs linear temperature), the result is a straight line and is referred to as the Viscosity Index. The use of a logarithmic scale is common practice since fluids can often undergo viscosity changes of several orders of magnitude over the temperature range of interest. Another common characterization of viscosity behavior relative to temperature is the Viscosity Temperature Coefficient (VTC), which is a measure of the fractional drop of viscosity with a rise in temperature. A discussion of such measurements can be found in the Kirk-Othmer Encyclopedia of Chemical Technology, Vol. 15, p. 475-478, $4^{th}$ Edition, John Wiley & Sons, NY.

The viscosity behavior of phase change inks with respect to temperature is generally more complex than industrial oils or conventional inks (such as Comparative Example 1 below). Thus, it is not generally possible to describe the phase change ink behavior with a single slope of a semi-log plot of viscosity versus temperature. However, describing three separate slopes in distinct temperature regions of the same plot may accurately depict the salient features of phase change ink behavior, specifically of phase change inks that provide for optimum printing performance.

It is conceptually simpler to follow the ink through the printing process starting with the jetting temperature first. At this temperature, the viscosity is relatively low and the rate of change of viscosity with respect to temperature is ideally relatively small so that small changes in the printhead temperature do not result in large changes in printing or jetting performance. The size of the rate of change can be expressed as the slope of the plot of the $\log_{10}$ viscosity versus temperature in degrees Celsius and, in the jetting temperature regime, preferably has an absolute value of less than 0.02.

Figure 5:
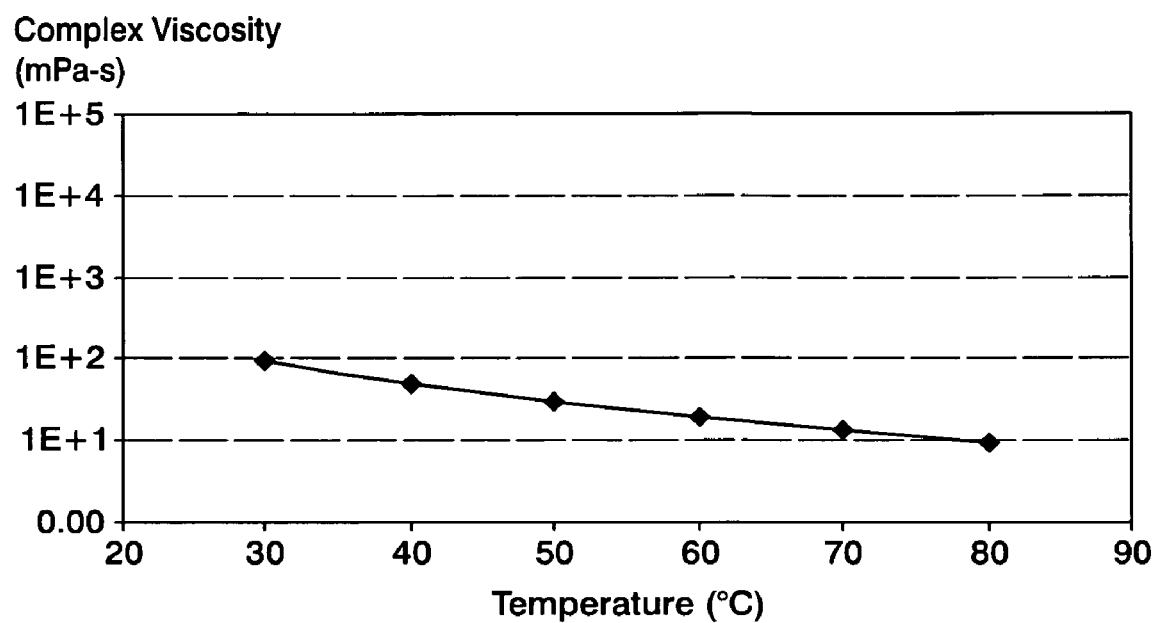
FIG. 5 depicts the complex viscosity of a comparative example.

In such plots, the slope may be calculated by dividing the change in viscosity between two temperatures by the change in temperature. Such a calculation represents the average slope between the two temperatures. As the difference in the two temperatures is decreased the accuracy of the slope calculation increases. It is understood that the change of viscosity with temperature is continuous even though common practice is to measure viscosity using a rheometer at discrete temperatures and interpolate between measurement points. In FIGS. 1, 3 and 5 the viscosity was measured every ten degrees; in FIG. 2 it was measured every five degrees It is also possible to derive an equation of the viscosity versus temperature curve using common mathematical tools and subsequently take the derivative of the viscosity curve equation to obtain a slope or rate of change of $\log_{10}$ viscosity with respect to temperature at every point along the curve.

Below the jetting temperature range, the phase change agent generally causes the viscosity to increase rapidly as the temperature decreases. In this region, viscosity is conveniently measured every 5-10° C. on a rheometer and the rate of change between two measurements, in other words the slope of the log viscosity versus temperature (° C.), is ideally greater than 0.08 in absolute terms.

Following the rapid change in viscosity of the ink at the temperature at which the phase change agents became effective, a third lower temperature regime characterizes the ink. At this lower temperature, the rate of change in viscosity with respect to temperature decreases. In absolute values, the average rate of change of viscosity (expressed as a base 10 logarithm) versus temperature in degrees Celsius preferably becomes less than 0.04.

The rate of change of viscosity with respect to temperature is an important measurement of the ink performance as it gives insight into ink behavior in the much faster dynamic of the print process compared to the rheometer measurement. In the rheometer, the ink sample is large at about 1-2 ml, and the temperature is carefully equilibrated at each temperature for three minutes. In the print process, the individual ink drop is small, about 20-50 picoliters. Although many drops may be used to form an image, the total volume remains considerably less than in a rheometer, and the process time short, a few seconds or even fractions of seconds. The rapid increase in viscosity versus temperature measured in the rheometer ensures that in the print process the viscosity rises sufficiently rapidly to prevent image bleed and paper show through in direct to paper applications or drop coalescence in intermediate drum or offset printing applications.

Many suitable rheometers can be used for making the measurements of viscosity over a range of temperatures, these include, but are not limited to: the ARES-RFS and AR 2000 available from TA Instruments, New Castle Del.; the Physica MCR family available from Anton Parr, Ashland Va.; the Bohlin C-VOR and Bohlin Visco 88 available from Malvern, Southborough Mass. the Viscotech and Stresstech available from ATS Rheosystems, Borden N.J.; the Haake Rheostress 1 available from Thermo Electron Corp. Waltham Mass.

The inks described herein are preferably jetted at temperatures of about 60° C. to about 110° C., preferably about 60° C. to about 90° C. The jetting temperature must be within the range of thermal stability of the composition, to prevent premature polymerization in the print head. At jetting, the inks preferably have a viscosity of from about 4 mPa-s to about 50 mPa-s, more preferably from about 4 mPa-s to about 22 mPa-s, and most preferably about 9 mPa-s to about 12 mPa-s. The inks are thus ideally suited for use in piezoelectric ink jet devices.

The inks can be employed in apparatus for direct printing ink jet processes, wherein when droplets of the melted ink are ejected in an imagewise pattern onto a recording substrate, the recording substrate is a final recording substrate. In this embodiment, the ink is heated to a temperature at or above the first temperature and printed directly onto an image receiving substrate. The image receiving substrate is preferably kept at or below the second temperature. For example, the substrate may be maintained at a temperature of about 20° C. to about 70° C., preferably from about 30° C. to about 40° C. The substrate temperature must be at least 10° C., but no more than 50° C., below the first temperature. Where the ink is radiation curable, the ink is exposed to radiation energy on the substrate to initiate polymerization of the polymerizable components of the ink.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during four to eighteen rotations (in an arbitrarily designated y-axis direction) of the intermediate transfer member with the ink jetting head undergoing a small translation in the x direction with respect to the transfer member in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. This approach simplifies the printhead design, while the small movements of the head ensure good droplet registration. Transfuse typically involves jetting the ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although it is preferably a drum or belt. The member surface may be at room temperature, although in embodiments it is preferable to heat the member such that a surface temperature thereof is maintained within a narrow temperature range so as to control the viscosity characteristics of the inks over a wide range of environmental conditions. This temperature is preferably at or below the second temperature. In this way, the ink is maintained on the surface of the transfer member until transfer to the image receiving substrate.

Once upon the intermediate transfer member surface, the jetted ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to Co-pending application Ser. No. 11/034,850 filed Jan. 14, 2005, incorporated herein by reference. This intermediate curing step may not be needed since the phase change is generally sufficient to impart the desired rheology to the ink droplets.

Following jetting to the intermediate transfer member and optional intermediate curing thereon, the ink is thereafter transferred to an image receiving substrate. The substrate may be any suitable material such as paper, boxboard, cardboard, fabric, a transparency, plastic, glass, metal, wood etc., although the ink is most preferably used in forming images on paper. Following transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, more preferably from about 0.2 to about 2 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 $ms^{-1}$ would require 1 second for a point of an image to pass under a single unit, while a belt speed 4.0 $ms^{-1}$ would require 0.2 s to pass under four bulb assemblies. The radiation to cure the polymerizable components of the ink is preferably provided by a variety of possible techniques, including but not limited to heat, a xenon lamp, laser light, D or H bulb, LED, a UV light source, etc. The curing light may be filtered, if desired or necessary. The curable components of the ink react to form a cured or crosslinked network of appropriate hardness. Preferably, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

EXAMPLES

The following examples illustrate specific embodiments of the present disclosure. One skilled in the art would recognize that the appropriate reagents, component ratio/compositions may be adjusted as necessary to achieve specific product characteristics. All parts and percentages are by weight unless otherwise indicated.

Example 1

An ink containing the components listed in Table 1 was prepared:

TABLE 1

| Components | Weight % |
| --- | --- |
| propoxylated neopentyl glycol diacrylate (curable monomer) | 75.12 |

TABLE 1-continued

| Components | Weight % |
| --- | --- |
| curable epoxy-polyamide composite gellant | 7.45 |
| Polyether-polyamide copolymer resin obtained from Arizona Chemical designated #1015_32 (non-curable gellant) | 2.79 |
| Irgacure 2959 (1-(4-(2-hydroxyethoxy)phenyl)-2-hydroxy-2-methylpropan-1-one) (photoiniator) | 2.79 |
| ITX (isopropylthioxanthone) (photoinitiator) | 1.86 |
| Irgacure 379 (2-benzyl 2-dimethylamino 1-(4-morpholinomethylphenyl) butanone-1) (photoinitiator) | 2.79 |
| Irgastab UV10 (Ciba Specialty Chemicals) (stabilizer) | 0.18 |
| cyan pigment dispersion (21 wt % pigment) | 6.99 |

This ink had the rheological data provided in Table 2 below. In this table, and tables that follow, the average slope (log complex viscosity vs. temperature) is determined between data set 1 and 2 and recorded in the table at data set 2; the next average slope is determined between data set 2 and 3 and recorded at data set 3 and so on. Because the change in viscosity is continuous, the ink clearly has a rate of change, that is, a slope, of the value recorded in, for example, data set 2 at some point between the temperature of data set 1 and the temperature of data set 2.

TABLE 2

| Data set | Temperature (° C.) | Complex Viscosity (mPa · s) | LOG Complex Viscosity | Average Slope (log complex viscosity vs. temperature) | G' (Pa) | G" (Pa) | tan_delta |
| --- | --- | --- | --- | --- | --- | --- | --- |
| 1 | 79.995 | 9.8998 | 0.995626 |  | 0.006058 | 0.061907 | 10.219 |
| 2 | 70.001 | 12.882 | 1.109983 | −0.01144 | 0.007532 | 0.08059 | 10.7 |
| 3 | 60 | 166.2 | 2.220631 | −0.11105 | 0.82055 | 0.64591 | 0.78717 |
| 4 | 50.002 | 5363.5 | 3.729448 | −0.15091 | 33.432 | 4.239 | 0.12679 |
| 5 | 39.998 | 48996 | 4.690161 | −0.09603 | 307.65 | 11.34 | 0.036862 |

A curve depicting this rheological data is depicted in FIG. 1.

Example 2

An ink containing the components listed in Table 3 was prepared:

TABLE 3

| Components | Weight % |
| --- | --- |
| bis[4-(vinyloxy)butyl] trimethyl-1,6-hexanediylbiscarbamate (mixture of 2,2,4- and 2,4,4-isomers) curable oil | 56.5 |
| bis[4-(vinyloxy)butyl] dodecanedioate curable viscosity modifier | 11.9 |
| R-gen ® BF-1172 photoinitiator | 7.9 |
| VEctomer ® 5015 curable viscosity modifier | 10.9 |
| 1-octadecanol phase change agent | 11.9 |
| BASF neopen blue dye | 0.9 |

This link had the rheological data provided in Table 4 below:

TABLE 4

| Data set | Temp. (° C.) | G' (Pa) | G" (Pa) | tan_delta | Complex viscosity (mPa·s) | Log Complex Viscosity | Average Slope (log complex viscosity vs. temperature) |
|---|---|---|---|---|---|---|---|
| 1 | 120.01 | 0.005248 | 0.049011 | 9.3384 | 7.845 | 0.894593 | |
| 2 | 115 | 0.005345 | 0.055562 | 10.396 | 8.8838 | 0.948599 | −0.01078 |
| 3 | 110 | 0.005184 | 0.064929 | 12.525 | 10.367 | 1.015653 | −0.01341 |
| 4 | 105 | 0.004795 | 0.074384 | 15.514 | 11.863 | 1.074195 | −0.01171 |
| 5 | 100 | 0.006107 | 0.086757 | 14.207 | 13.842 | 1.141199 | −0.0134 |
| 6 | 95.003 | 0.005204 | 0.10015 | 19.247 | 15.961 | 1.20306 | −0.01238 |
| 7 | 90.001 | 0.005574 | 0.11803 | 21.175 | 18.805 | 1.274273 | −0.01424 |
| 8 | 85 | 0.00541 | 0.14005 | 25.889 | 22.306 | 1.348422 | −0.01483 |
| 9 | 80 | 0.005192 | 0.16699 | 32.161 | 26.59 | 1.424718 | −0.01526 |
| 10 | 75 | 0.005634 | 0.20203 | 35.861 | 32.166 | 1.507397 | −0.01654 |
| 11 | 70 | 0.005364 | 0.24637 | 45.934 | 39.22 | 1.593508 | −0.01722 |
| 12 | 64.998 | 0.005529 | 0.30697 | 55.525 | 48.864 | 1.688989 | −0.01909 |
| 13 | 60.002 | 0.006261 | 0.38477 | 61.454 | 61.247 | 1.787085 | −0.01963 |
| 14 | 54.997 | 0.006612 | 0.49309 | 74.581 | 78.485 | 1.894787 | −0.02152 |
| 15 | 49.998 | 0.006492 | 0.64118 | 98.773 | 102.05 | 2.008813 | −0.02281 |
| 16 | 44.997 | 28.512 | 103.26 | 3.6215 | 17049 | 4.231699 | −0.44449 |
| 17 | 40.01 | 121.32 | 837.93 | 6.907 | 135E+05 | 5.129529 | −0.18003 |
| 18 | 34.993 | 1009.6 | 2536 | 2.512 | 4.34E+05 | 5.63792 | −0.10133 |
| 19 | 29.989 | 1890 | 5145.4 | 2.7224 | 8.72E+05 | 5.940726 | −0.06051 |

Figure 2:
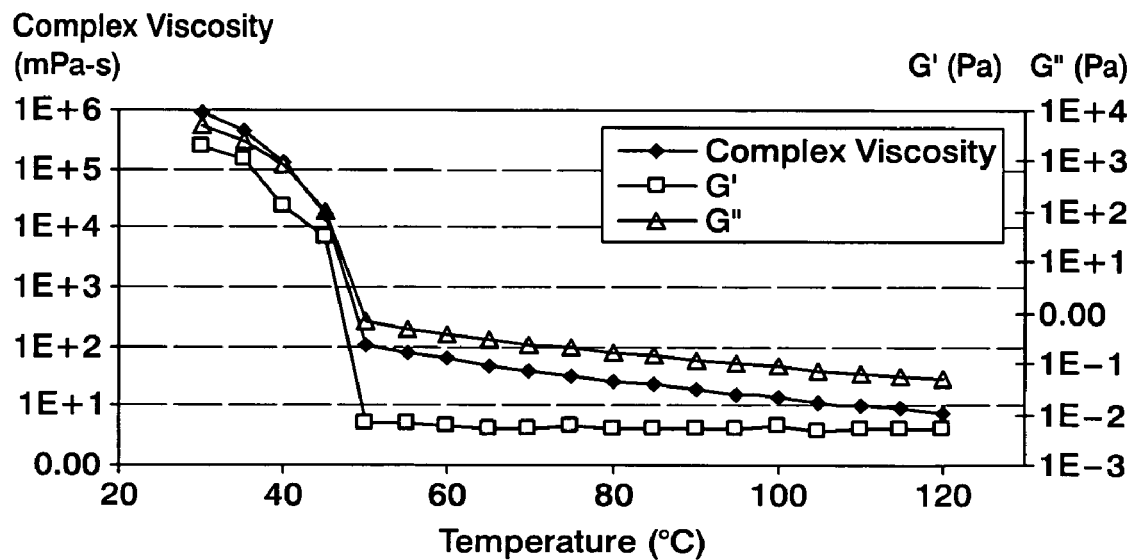
Figure 3:
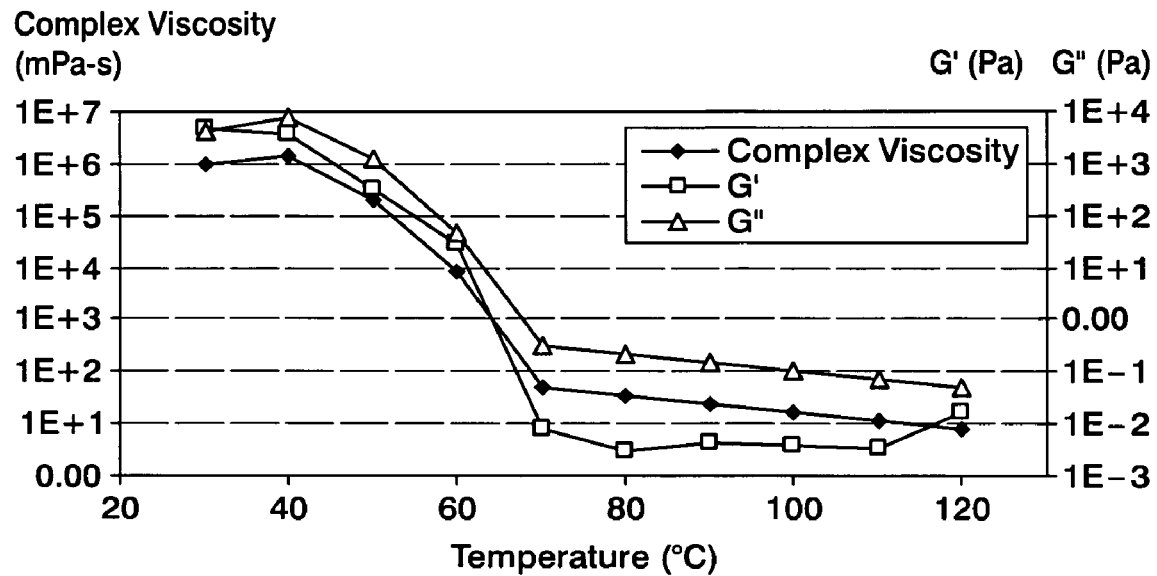

A curve depicting this rheological data is depicted in FIG. 2.

Example 3

An ink containing the components listed in Table 5 was prepared:

TABLE 5

| Components | Weight % |
|---|---|
| bis[4-(vinyloxy)butyl] trimethyl-1,6-hexanediylbiscarbamate (mixture of 2,2,4- and 2,4,4-isomers) curable oil | 50.7 |
| hydrogenated Castor oil phase change agent | 28.8 |
| bis[4-(vinyloxy)butyl] dodecanedioate viscsoity modifier | 10.0 |
| R-gen ® BF-1172 photoinitiator (cationic photoinitiator; substituted triarylsulfonium hexafluorophosphate salt in propylene carbonate as a 40% solution; obtained from Chitec Chemical Co., Ltd., Taiwan, R.O.C.) | 10.0 |
| red olefin dye | 0.5 |

This link had the rheological data provided in Table 6 below:

TABLE 6

| Data set | Temperature (° C.) | Complex viscosity (mPa·s) | G' (Pa) | G" (Pa) | Log Complex Viscosity | Average Slope (log complex viscosity vs. temperature) |
|---|---|---|---|---|---|---|
| 1 | 120 | 8.044 | 0.016933 | 0.047621 | 0.905472 | |
| 2 | 110 | 11.758 | 0.003571 | 0.073794 | 1.070333 | −0.01649 |
| 3 | 99.996 | 16.103 | 0.003833 | 0.10111 | 1.206907 | −0.01365 |
| 4 | 89.998 | 22.779 | 0.004364 | 0.14306 | 1.357535 | −0.01507 |
| 5 | 79.999 | 32.869 | 0.002952 | 0.2065 | 1.516786 | −0.01593 |
| 6 | 69.999 | 50.715 | 0.007751 | 0.31856 | 1.705136 | −0.01883 |
| 7 | 59.994 | 8327.5 | 28.006 | 44.197 | 3.920515 | −0.22143 |
| 8 | 50.004 | 1.99E+05 | 335.68 | 1204.1 | 5.298744 | −0.13796 |
| 9 | 39.998 | 1.43E+06 | 3888.1 | 8108.2 | 6.1557 | −0.08564 |
| 10 | 30.001 | 1.02E+06 | 4696.4 | 4326.8 | 6.007022 | 0.014872 |

A curve depicting this rheological data is depicted in FIG. 3.

Example 4

An ink containing the components listed in Table 7 was prepared:

TABLE 7

| Components | wt % |
|---|---|
| Dimer acid based diamide diester gellant: condensation product of dimer acid (2 mol), ethylene diamine (1 mol) and caprolactone acrylate (2 mol) | 7.5 |
| propoxylated neopentyl glycol diacrylate (curable monomer) | 71.5 |
| Irgacure 379 (2-benzyl 2-dimethylamino 1-(4-morpholinomethylphenyl) butanone-1) (photoinitiator) | 3.0 |
| ITX (isopropylthioxanthone) (photoinitiator) | 2.0 |
| Irgacure 819 [bis(2,4,6-trimethylbenzoyl)-phenylphosphineoxide] (photoinitiator) | 1.0 |
| Irgacure 127 (2-hydroxy-1-(4-(4-(2-hydroxy-2-methylpropionyl)-benzyl)-phenyl)-2-methylpropan-1-one) (photoinitiator) | 3.5 |
| Irgastab UV10 (Ciba Specialty Chemicals) (stabilizer) | 0.2 |

TABLE 7-continued

| Components | wt % |
|---|---|
| Sun black 7 pigment dispersion, 1028-46E, 26.5 wt % | 11.3 |

This link had the rheological data provided in Table 8 below:

TABLE 8

| Data set | Temperature (° C.) | Complex Viscosity (mPa · s) | G' (Pa) | G" (Pa) | tan delta | Log Complex Viscosity | Average Slope (log Complex Viscosity vs. temperature) |
|---|---|---|---|---|---|---|---|
| 1 | 89.998 | 4.5915 | 0.006365 | 0.028138 | 4.4208 | 0.661955 | |
| 2 | 85 | 5.073 | 0.005096 | 0.031465 | 6.1749 | 0.705265 | −0.00866552 |
| 3 | 79.999 | 5.5286 | 0.003949 | 0.034512 | 8.7392 | 0.742615 | −0.00746857 |
| 4 | 75 | 6.5031 | 0.007711 | 0.040126 | 5.2036 | 0.81312 | −0.01410387 |
| 5 | 69.997 | 8.0366 | 0.015367 | 0.0481 | 3.1301 | 0.905072 | −0.01837936 |
| 6 | 65 | 682.01 | 1.6704 | 3.9462 | 2.3624 | 2.833791 | −0.38597526 |
| 7 | 59.999 | 1.25E+04 | 67.469 | 39.656 | 0.58776 | 4.095344 | −0.25226015 |
| 8 | 55 | 8.02E+04 | 443.99 | 238.41 | 0.53697 | 4.904207 | −0.16180499 |
| 9 | 50.004 | 1.76E+05 | 986.53 | 493.24 | 0.49997 | 5.244376 | −0.06808832 |
| 10 | 44.999 | 2.95E+05 | 1682.8 | 771.02 | 0.45817 | 5.469233 | −0.0449264 |
| 11 | 40 | 4.41E+05 | 2555.5 | 1075.7 | 0.42093 | 5.644724 | −0.03510529 |
| 12 | 34.999 | 6.17E+05 | 3607.5 | 1427.6 | 0.39574 | 5.790623 | −0.02917393 |
| 13 | 29.996 | 8.07E+05 | 4724.2 | 1843.2 | 0.39016 | 5.906917 | −0.02324479 |

Figure 4:
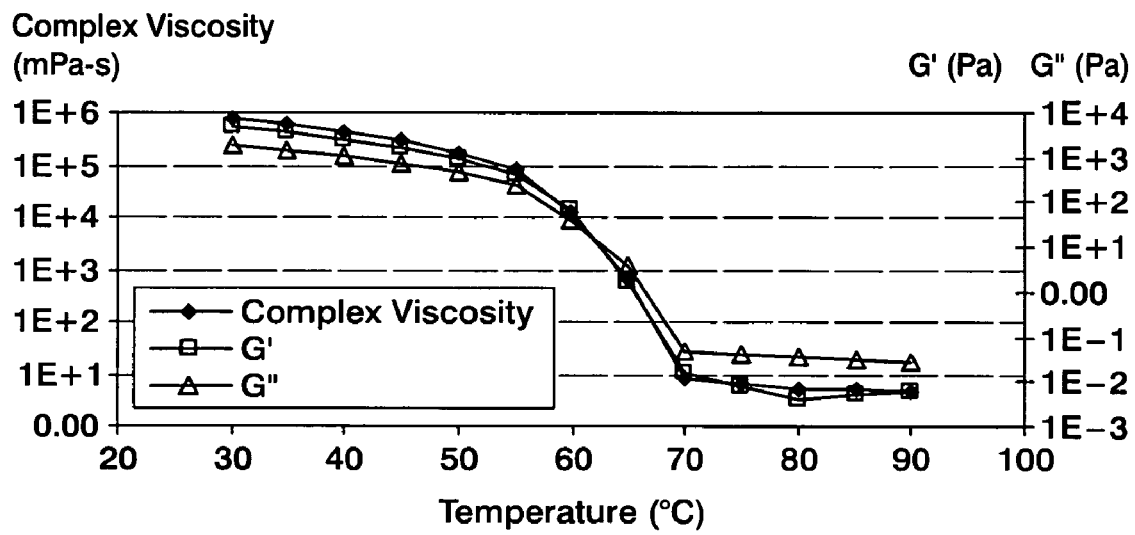

Table 8 illustrates near ideal ink behavior at about 70° C. where the ink viscosity is a low 8.03 mPa·s and is easily jetted (data set 5). At 65° C. (data set 6), the viscosity has risen rapidly to 682 mPa·s and the average rate of change between the two data points is 0.385 dimensionless logarithmic units of viscosity per degree Celsius. Between the next two temperature readings 65° C. and about 60° C. (data sets 6 and 7), the viscosity rises to 1.25×10$^4$ mPa·s and the average rate of change between the two points is 0.252 dimensionless logarithmic units of viscosity per degree Celsius. A curve depicting this rheological data is depicted in FIG. 4.

Comparative Example 1

An ink containing the components listed in Table 9 was prepared:

TABLE 9

| Components | wt % |
|---|---|
| Ebecryl 812 polyester oligomer from Cytec | 36 |
| propoxylated neopentyl glycol diacrylate (curable monomer) | 56.7 |

TABLE 9-continued

| Components | wt % |
|---|---|
| ITX (isopropylthioxanthone) (photoinitiator) | 1.8 |
| Irgacure 369 (2-benzyl 2-dimethylamino 1-(4-morpholinophenyl) butan-1-one) | 1.8 |
| Irgacure 2959 (1-(4-(2-hydroxyethoxy)phenyl)-2-hydroxy-2-methylpropan-1-one) (photoiniator) | 2.7 |
| red olefin dye | 0.9 |

This ink had the rheological data provided in Table 10 below:

TABLE 10

| Data set | Temperature ° C. | Complex Viscosity mPa · s | Log Complex viscosity | Average Slope (Log Complex Viscosity vs. temperature) | G' (Pa) | G" (Pa) | tan_delta |
|---|---|---|---|---|---|---|---|
| 1 | 80.003 | 9.542 | 0.979639 | | 0.01 | 0.059697 | 10.771 |
| 2 | 69.999 | 13.186 | 1.120113 | −0.014041749 | 0.01 | 0.082698 | 16.448 |
| 3 | 60.012 | 19.401 | 1.287824 | −0.016792935 | 0.01 | 0.12176 | 21.423 |
| 4 | 50.011 | 30.043 | 1.477743 | −0.018990019 | 0.01 | 0.18868 | 31.748 |
| 5 | 40.025 | 50.33 | 1.701827 | −0.022439779 | 0.01 | 0.31619 | 62.062 |
| 6 | 29.984 | 92.649 | 1.966841 | −0.026393169 | 0.01 | 0.58209 | 87.861 |

A curve depicting this rheological data is depicted in FIG. 5.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A phase change ink comprising a phase change agent, a curable monomer, and optionally a colorant, having a viscosity of from about 4 mPa-s to about 50 mPa-s at a first temperature from about 70° C. to about 110° C. and having a viscosity of from $10^4$ mPa-s to about $10^9$ mPa-s at a second temperature from about 30° C. to about 60° C., said second temperature being below said first temperature by at least 10° C., but by no more than 50° C., wherein said phase change ink has a storage modulus, G', that is higher than its loss modulus, G", at said second temperature.

2. The phase change ink according to claim 1, wherein said second temperature is from about 15° C. to about 45° C. below said first temperature.

3. The phase change ink according to claim 1, wherein said phase change ink has a viscosity of from about 9 mPa-s to about 12 mPa-s at said first temperature.

4. The phase change ink according to claim 1, wherein said phase change ink has a viscosity of from about $5\times10^4$ mPa-s to about $10^7$ mPa-s at said second temperature.

5. The phase change ink according to claim 1, wherein said phase change ink has a storage modulus, G', of from about $10^{-3}$ to about $10^{-2}$ Pa at said first temperature and of at least about 10 Pa at said second temperature.

6. The phase change ink according to claim 1, wherein said phase change ink has a loss modulus, G", of from about $10^{-3}$ to about $10^{-1}$ Pa at said first temperature and of at least about 10 Pa at said second temperature.

7. The phase change ink according to claim 1, wherein a curve of $\log_{10}$ viscosity of the phase change ink plotted against temperature in degrees Celsius has a slope having an absolute value less than 0.02 at said first temperature.

8. The phase change ink according to claim 1, wherein a curve of $\log_{10}$ viscosity of the phase change ink plotted against temperature in degrees Celsius has a slope having an absolute value greater than 0.08 for at least a region between said first and second temperatures.

9. The phase change ink according to claim 1, wherein a curve of $\log_{10}$ viscosity of the phase change ink plotted against temperature in degrees Celsius has a slope having an absolute value less than 0.04 at or below said second temperature.

10. The phase change ink according to claim 1, wherein said ink is radiation curable.

11. A method for forming an image, said method comprising:

(a) providing a phase change ink according to claim 1 at or above said first temperature; and (b) applying said phase change ink to a substrate to form an image, said substrate being at or below said second temperature.

12. The method according to claim 11, wherein said phase change ink is applied to the substrate by ink jet printing.

13. A method for forming an image, said method comprising:

(a) providing a phase change ink according to claim 10 at or above said first temperature;

(b) applying said phase change ink to a substrate to form an image, said substrate being at or below said second temperature; and (c) exposing the phase change ink to radiation to cure the ink.

14. The method according to claim 13, wherein, between steps (b) and (c), said phase change is transferred to a second substrate.

15. A printer cartridge comprising phase change ink according to claim 1.

16. A printer comprising a printer cartridge according to claim 15.

17. A phase change ink comprising a phase change agent, a curable monomer, and optionally a colorant, having a viscosity of from about 4 mPa-s to about 50 mPa-s at a first temperature from about 70° C. to about 110° C. and having a viscosity of from $10^4$ mPa-s to about $10^9$ mPa-s at a second temperature from about 30° C. to about 60° C., wherein a curve of $\log_{10}$ viscosity of the phase change ink plotted against temperature in degrees Celsius has a slope having an absolute value less than 0.02 at said first temperature and has a slope having an absolute value greater than 0.08 for at least a region between said first and second temperatures and wherein said phase change ink has a storage modulus, G', that is higher than its loss modulus, G", at said second temperature.

18. The phase change ink according to claim 17, wherein said curve has a slope having an absolute value less than 0.04 at said second temperature.

19. A phase change ink comprising a phase change agent, a curable monomer, and optionally a colorant, having a viscosity of from about 4 mPa-s to about 50 mPa-s at a first temperature from about 70° C. to about 110° C. and having a viscosity of from $10^4$ mPa-s to about $10^9$ mPa-s at a second temperature from about 30° C. to about 60° C., wherein said phase change ink has a storage modulus, G', that is higher than its loss modulus, G", at said second temperature.

20. The phase change ink according to claim 11, wherein a temperature of the substrate is maintained from about 30° C. to about 60° C.

* * * * *